US005543592A

United States Patent [19]

Gaultier et al.

[11] Patent Number: 5,543,592

[45] Date of Patent: Aug. 6, 1996

[54] MULTIMODE MANIPULATOR

[75] Inventors: Philippe Gaultier, Le Chesnay; Patrick Vouillon, Villebon sur Yvette; Frédéric Simon, Elancourt, all of France

[73] Assignee: Sextant Avionique, Meudon La Foret, France

[21] Appl. No.: 249,922

[22] Filed: May 26, 1994

[30] Foreign Application Priority Data

Jul. 23, 1993 [FR] France .................................. 93 09205

[51] Int. Cl.[6] ............................ H01H 25/04; G01L 1/22; G01L 5/22; G09G 5/02

[52] U.S. Cl. ................ 200/6 A; 73/862.05; 74/471 XY; 338/2; 345/161

[58] Field of Search .................................... 200/1 R, 5 R, 200/5 A, 6 A; 338/2, 5; 345/161; 73/862.05, 862.041–862.045; 74/471 Y; 340/870.01, 870.44; 341/20–35; 364/709.01–709.16; G05G 9/04; H01H 25/04, 25/06

[56] References Cited

U.S. PATENT DOCUMENTS

| | | | |
|---|---|---|---|
| 4,155,263 | 5/1979 | Frantz | 73/771 |
| 4,217,569 | 8/1980 | Nejedly et al | 338/2 |
| 4,348,634 | 9/1982 | David et al. | 323/353 |
| 4,747,313 | 5/1988 | Okada | 73/862.04 |
| 4,849,730 | 7/1989 | Izumie et al. | 338/2 |
| 4,876,524 | 10/1989 | Jenkins | 338/2 |
| 5,107,080 | 4/1992 | Rosen | 200/6 A |
| 5,228,348 | 7/1993 | Frigiere | 73/862.05 |

FOREIGN PATENT DOCUMENTS

| | | | |
|---|---|---|---|
| 0023864 | 2/1981 | European Pat. Off. | B25J 13/02 |
| 2659789 | 9/1991 | France | H01H 25/04 |
| 2211280 | 6/1989 | United Kingdom | G05G 9/04 |

OTHER PUBLICATIONS

IBM Technical Disclosure Bulletin. vol. 32, No. 4A, Sep. 1989, New York (US), pp. 138–139.

*Primary Examiner*—J. R. Scott
*Attorney, Agent, or Firm*—Browdy and Neimark

[57] ABSTRACT

The manipulator embodying the invention comprises a disk mounted rotatably about an axis by a shaft and capable of pivoting about a center of rotation with elastic return motion towards a home position, a detector which determines the angular position of the disk in relation of the axis, strain gauges detecting the orientation of the disk with respect to the center of rotation, a reversing switch for switching from an operating mode in which the data relating to the orientation of the shaft are taken into account, to an operating mode in which the data ralating to the angular position of the disk are taken into account, and a switch for validating one or other of these data. The invention applies notably to the remote control of a cursor on a screen.

9 Claims, 2 Drawing Sheets

MULTIMODE MANIPULATOR

BACKGROUND OF THE INVENTION

1. Field of the Invention

This invention relates to a manipulator with multiple operating modes that can be used in numerous applications such as e.g. the remote controlling, driving or the management of a cursor on a display associated with a processor.

2. Description of the Prior Art

Manipulators of this type usually use a control lever capable of pivoting on a fixed structure and which is associated with a detection means susceptible of supplying electric signals representing the orientation and, possibly, the amplitude of the transversal displacements of the lever (or possibly just the transversal forces exerted on the latter).

Such a manipulator, which uses strain gauges as a means of detection, is described in French patent No. 2,659,789 filed in the name of the applicant hereof. In this example, the lever is also axially mobile so as to enable the operating of a push-button of a validating switch and to enable the operator to simultaneously perform a manoeuver action (by exerting a transversal force on the lever) and an independent validation action (by subjecting the lever to an axial exertion).

It so happens that these manipulations, which ergonomically suit certain driving and remote manipulation functions, do not easily lend themselves to the management of a cursor on a screen, e.g. in the case of applications such as computer-assisted design or drafting.

It is for this reason that graphical tablets or devices such as mice or trackballs are preferred for applications of this type.

Conversely, these means can be observed to be poorly suited to driving and to remote manipulation.

OBJECT OF THE INVENTION

The main object of this invention is to remedy the preceding disadvantages, particularly to provide a manipulator combining the advantages of the above-mentioned solutions without having the drawbacks thereof, in order to be usable both for cursor management or similar and for driving and remote manipulation.

SUMMARY OF THE INVENTION

Accordingly, in order to achieve these ends, there is provided a multimode manipulator using:

- a control device mounted rotatably about an axis of rotation by means of a substantially coaxial shaft,
- an articulating means enabling said shaft to pivot about a center of rotation under the effect of a force exerted on the control device with elastic return motion to the home position once said exertion ceases,
- a means for detecting the angular position of the control device about said axis,
- a means for detecting of the orientation of the shaft about said center of rotation,
- a reverse switching means enabling switching from a first operating mode in which at least the data relating to the orientation of the shaft are taken into account, to a second operating mode in which at least the angular position data are taken into account,

- a means for validating data generated by said detecting means and pertaining to the angular position of the control device and to the orientation of the shaft.

It is obvious that in the first operating mode, the operator can use the manipulator in a conventional manner. In the second mode, the operator can rotate the control device about its axis of rotation, e.g. to perform a corresponding synchronous rotation of a controlled device.

In the case of cursor displacement management, such a solution can enable the determining and displaying on a screen (e.g. by means of an axis rotating about a point of the cursor in correspondence with the rotation of the control device) of the direction to be taken by the latter in order to reach a required location. The action on controlling means, which can consist of the validating means, can then bring about displacement of the cursor in the direction thus determined until it reaches the location selected.

BRIEF DESCRIPTION OF THE DRAWINGS

Further features and advantages of the invention will be apparent from the embodiments of the invention described, by way of non-limiting examples, in reference to the corresponding accompanying drawings in which.

DESCRIPTION OF THE PREFERRED EMBODIMENTS

Figure 1:
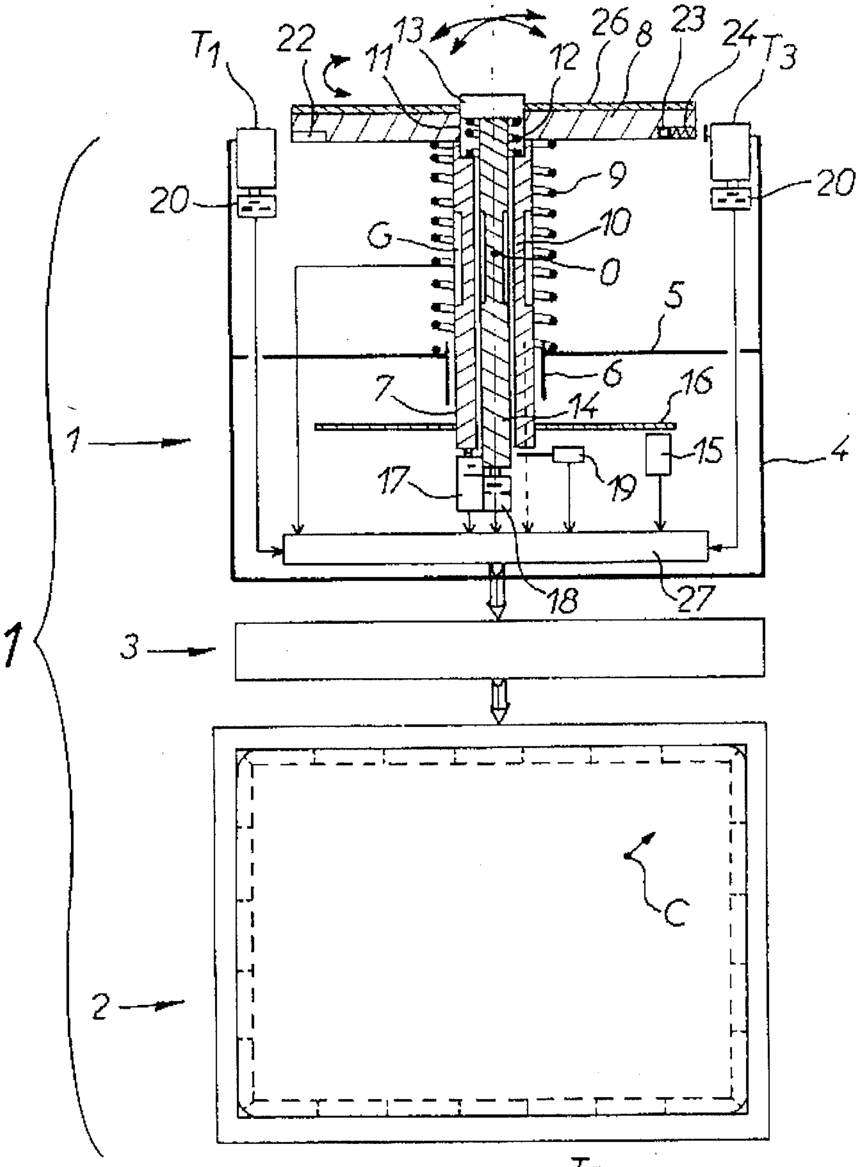
FIG. 1 is a schematic representation showing a vertical axial section of a manipulator embodying the invention used to manage a cursor displayed on a screen.
Figure 2:
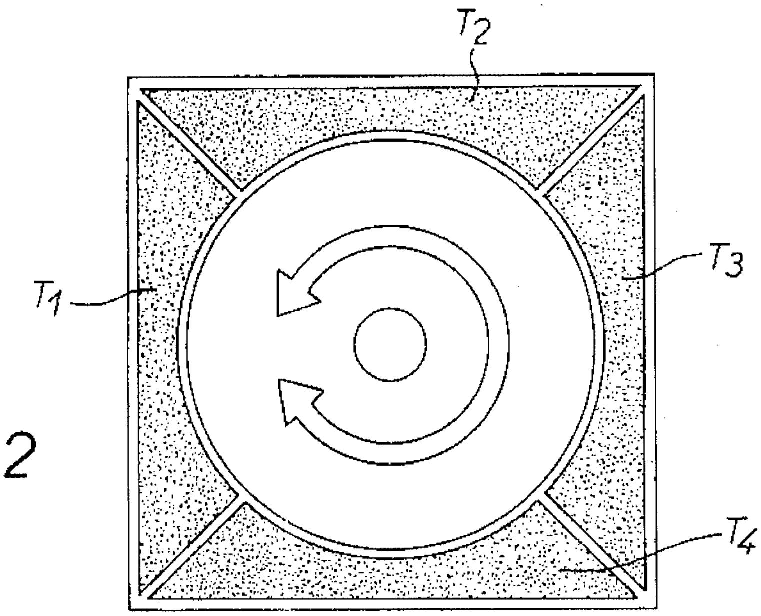
FIG. 2 is a top view of the manipulator represented in FIG. 1.

In the example represented in FIG. 1, the manipulator 1 is intended to ensure the management of a cursor C displayed on the screen 2 of a display device associated with a processor 3.

This manipulator comprises a parallelepiped-shaped case 4 of which the upper side 5 is fitted with a vertical central bearing 6 in which a tubular rotary shaft 7 can pivot and axially slide.

At its upper end, the rotary shaft 7 bears a rotary disk 8 which extends parallel to the upper side 5.

The axial position of the shaft and disk assembly 7, 8 is maintained by a compression spring 9 disposed coaxially between the upper side 5 and the disk 8.

The tubular shaft 7 comprises a thin portion 10 situated substantially half-way between the upper side 5 and the disk. This thin region forms an elastic articulation, as it were, similar to a pivot pin and by way of which the assembly formed by the disk 8 and the upper part of the shaft 7 can pivot about a center of rotation 0, e.g. under the effect of an axial pressure exerted on the periphery of the disk 8.

The disk 8 further comprises a coaxial central cavity 11 communicating with the inner volume of the tubular shaft 7 and in which is slidably mounted, with return motion by means of a spring 12, a coaxial push-button 13 integral with a shaft 14.

Furthermore, this case 4 houses the following:

- a detector 15 arranged opposite a code wheel 16 borne by the tubular shaft 7, coaxially with the latter;

- a microswitch 17 disposed beneath the tubular shaft 7 in order to be operated by the latter when, subsequent to pressure exerted on the disk 8, the shaft 7 moves downwards against the action of the spring 9 and beyond a predetermined stroke;
- a microswitch 18 disposed beneath the end of the rod 14 extending outward from the lower end of the tubular shaft 7, in order to be operated subsequent to pressure exerted on the push-button 13;
- an optional strain gauge 19 placed in parallel with or in replacement of the switch 17 so as to obtain a signal proportional to the force exerted on the disk 8, and
- a strain gauge device G mounted on the shaft at the level of the thin portion in order to be able to determine the orientation of the deflection of the shaft; this device can advantageously comprise four strain gauges spaced regularly apart about the shaft so that a deflection of the latter causes an extension or a compression of the strain gauges.

In this example, the upper side 5 of the case 4 supports four trapezoidal function keys $T_1$ to $T_4$ of inwardly curved small base which take up the space included between the disk 8 and the lateral edges of the case 4. These function keys $T_1$ to $T_4$ act on respective switches 20 mounted on the upper side 5.

The cylindrical surface of the disk 8 is fitted with a notched track 22 on which is mounted a ball 23 acted against by a spring 24 seated on the case 4, in order to generate a tactile sensation when the disk 8 is rotated.

The upper side of the disk 8 can be covered by a touch-sensitive layer 21 capable of detecting the presence of a finger or hand in close proximity to the disk 8, or even a grazing of the latter.

The switches 17, 18, 20, the detector 15, the strain gauge 19, the touch-sensitive surface 26 and the strain gauge device G are connected to an interfacing circuit 27 which ensures a shaping of the signals supplied by these elements and transmits them in an appropriate digital form to the processor 3. The latter is notably designed so as to determine, as a function of the data transmitted by the strain gauge device G, the intensity and direction, in a radial plane of the deflection of the tubular shaft 7.

As previously described, the manipulator 1 has two main operating modes that can be selected e.g. by means of the key $T_1$, i.e.

- a first operating mode corresponding to that of a conventional manipulator and which uses the strain gauge device G to define the position and intensity of a force exerted on the disk 8, and
- a second operating mode which uses the detector 15 associated with the code wheel 16 to provide the processor with data pertaining to the angular position.

These two operating modes can, of course, further use the keys $T_1$ to $T_4$, the push-button 13, the switch 18 enabling detection of the axial displacement of the tubular shaft, and the touch-sensitive layer 26, the functions assigned to these different means depending on the type of application.

Operation of the manipulator according to the first mode is conventional and will therefore not be described in detail.

However, operation in the second mode enables the performing, in a particularly original and advantageous manner, of multiple functions such as, notably, displacement of the cursor towards a point to be reached, with or without plot display, the reading of a course and/or the distance from the cursor to a singular point, etc.

When the operator wishes to move the cursor from the point A, at which it is located, towards a point X, he firstly selects the corresponding operating mode by exerting pressure on the key $T_1$ and then puts his fingers on the disk 8. The touch-sensitive layer 26 detects the presence of the fingers and advises the processor 3 which then proceeds to display an axis Δ' (in broken lines) passing through the center of the cursor C and showing the last orientation given to the latter.

The operator then pivots the disk 8, the angular data of this pivotal movement being transmitted to the processor 3 by the detector 15 which, in turn, causes the axis to pivot about the center 0.

The operator can of course continue this pivoting until the axis A passes through the point X to be reached.

The operator then exerts pressure on the disk 8 so as to cause a switching of the switch 17. The latter transmits a signal to the processor 3 which commands a displacement of the cursor C along the axis Δ, in the direction of the point X to be reached.

When the strain gauge 19 is used, the speed of displacement of the cursor C can be made proportional to the force exerted on the disk 8 (to each value of the exertion detected by the gauge 19 can correspond a predetermined forward speed value).

Once the cursor C has reached the point X required, the operator can press the push-button 13 to cause a switching of the switch 18, thereby validating the position of the cursor C. This validation can be translated by a taking into account of the coordinates of the cursor C by the processor 3, by a singularizing of the point X on the screen and, possibly, by the erasing of the axis Δ.

Of course, by selecting a graphic mode, e.g. by acting on a key 20, the displacement of the cursor C can be displayed persistently. In this case, the plotting is maintained subsequent to the erasing of the axis Δ.

Figure 3:
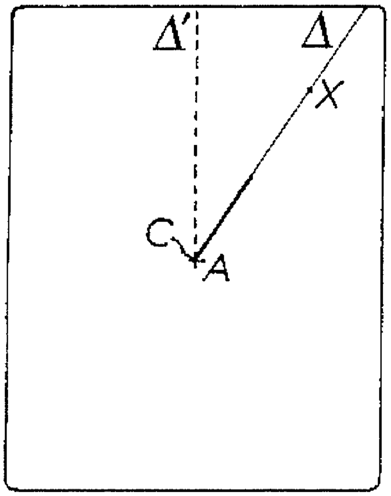
FIGS. 3, 4 and 5 are ischematic representations of the screen/enabling an operating mode of the manipulator to be illustrated.

FIG. 3, which illustrated the process previously described, shows the screen display of the cursor path from the initial position A towards a point X on the axis Δ (the initial direction Δ' of this axis Δ being indicated in broken lines).

Figure 4:
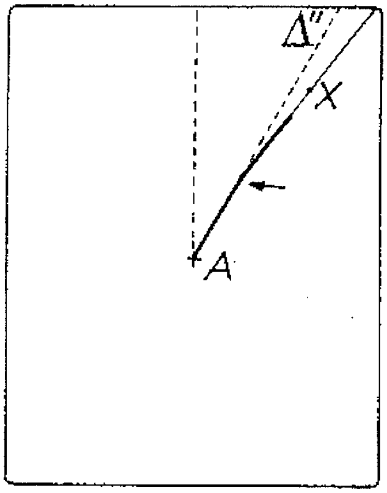

However, the operating mode used in this example is not unique: it would be possible, during a first stage, to roughly orientate the axis Δ" as represented in FIG. 4 in broken lines, (e.g. by using the first operating mode) and then to proceed to make one or more changes of direction to reach the point X.

This change of direction can be performed by turning the disk 8, with or without interruption of cursor displacement, i.e. without or without pressure on the disk 8.

It is clearly evident that, by combining the pressure on and rotation of the disk 8, curved or even circular paths of the cursor can be obtained.

Figure 5:
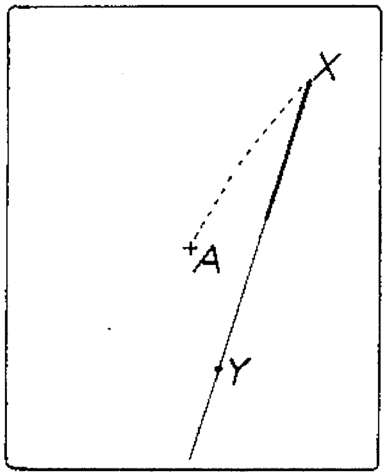

From the point X, the cursor C can be brought to a point Y in a similar manner to that described previously (FIG. 5).

By way of these features, the manipulator previously described provides numerous possibilities.

It enables e.g. definition of the course the cursor must follow to reach a required point as well as the distance separating the cursor from this point, these data being displayable on the screen once the cursor-related axis has been oriented so as to pass through this point and once this orientation has been validated.

It enables speedy selection of command areas arranged e.g. around the screen (e.g. as shown in broken lines in FIG. 1), by simply orienting the axis relating to the cursor C so that it passes through the area selected and by validating the corresponding orientation (without necessarily having to move the cursor along the axis Δ).

Moreover, the two previously described operating modes can be combined in certain applications and, in particular, for cursor management.

In this case, the first operating mode can be used to perform a fast but rough orientation of the cursor-related axis, the second mode then serving to display this orientation.

The invention is not, of course, limited to the embodiment previously described.

Figure 6:
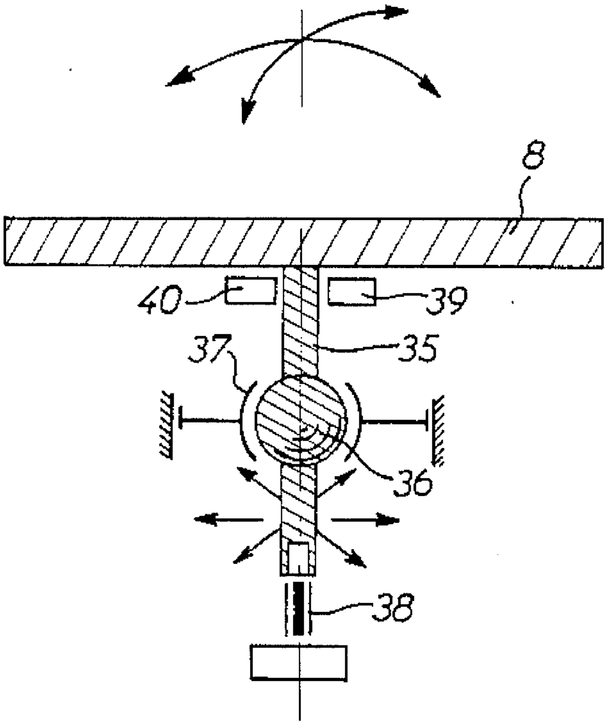
FIG. 6 is a schematic view showing an axial section of another embodiment of the manipulator.

Thus, according to the embodiment illustrated in FIG. 6, the shaft 35 bearing the disk 8 could comprise a spherical portion 36 pivoting in shells 37 of complementary shape interdependent with the case or with a structure susceptible of translation with regard to the latter. The lower end of the shaft 35 is then coupled with a strain gauge 38 simultaneously ensuring detection of the order of displacement of the cursor C, the direction of the axis Δ relating to the cursor and the speed of displacement of the cursor C. In this case, the orientation of the axis relating to the cursor is not obtained by a rotation of the disk 8 but by pressing the disk in an area oriented (in relation to the center of the disk) in correspondence with the required orientation of the cursor-related axis.

Stops 39, 40 can be provided in order to limit the tilting of the shaft 35.

We claim:

1. A manipulator with multiple operating modes which comprises:

a control member actuated by an operator's finger, a shaft fixed on said control member and rotatably mounted about a coaxial axis of rotation so as to allow said control member to be rotated about said axis under the effect of a pivoting force exerted by said finger, hinging means provided in a central part of said shaft so as to enable said shaft and said control member to rock about a center of rotation located on said axis in said central part, under the effect of a rocking force distinct from said pivoting force, exerted by said finger in a rocking position and with a variable intensity, spring means for exerting on said control member a return motion to a home position once said rocking force ceases, means for detecting an angular position of said control member about said axis and for generating first data representing said angular position, means for detecting a rocking position of the control member and for generating second data representing said rocking position and said variable intensity, selecting means actuated by said finger for selecting a first operating mode, in which at least said first data are taken into account, a second operating mode in which only said second data are taken into account, and a third mode in which said first and said second data are both taken into consideration, validation means actuated by said finger for validating said first and second data.

2. The manipulator as claimed in claim 1, wherein said hinging means comprise a flexible portion of said shaft, and wherein said means for detecting the rocking position of said shaft comprise a strain gauge device arranged at said central part.

3. The manipulator as claimed in claim 1, wherein said hinging means comprise a pivot link provided between a fixed or translatable supporting structure and said central part of said shaft, and wherein said means for detecting the rocking position of said shaft comprise a strain gauge device coupled with an end of said shaft opposite said control member.

4. The manipulator as claimed in claim 1, wherein said shaft is axially mobile against the action of an elastic means and controls means provided for detecting axial displacements of said shaft.

5. The manipulator as claimed in claim 1, wherein said means for detecting the angular position of said control member comprises a code wheel fixed on said shaft and associated with a detector.

6. The manipulator as claimed in claim 1, wherein said shaft is tubular, and wherein said validating means comprises a push-button mounted slidably with spring-load return motion into a central cavity provided in said control member, coaxially thereto, said push-button cooperating with a switch.

7. The manipulator as claimed in claim 1, comprising a plurality of switches arranged around the control member.

8. The manipulator as claimed in claim 1, wherein said control member is covered with a touch-sensitive layer susceptible of detecting the presence of one of the operator's fingers.

9. A device for the management of a cursor on a display associated with a processor, said device comprising a manipulator with multiple operating modes which comprises:

a control member actuated by an operator's finger, a shaft fixed on said control member and rotatably mounted about a coaxial axis of rotation so as to allow said control member to be rotated about said axis under the effect of a pivoting force exerted by said finger, hinging means provided in a central part of said shaft so as to enable said shaft and said control member to rock about a center of rotation located on said axis in said central part, under the effect of a rocking force distinct from said pivoting force, exerted by said finger in a rocking position and with a variable intensity, spring means for exerting on said control member a return motion to a home position once said rocking force ceases, means for detecting an angular position of said control member about said axis and for generating first data representing said angular position, means for detecting a rocking position of the control member and for generating second data representing said rocking position and said variable intensity, selecting means actuated by said finger for selecting a first operating mode, in which at least said first data are taken into account, a second operating mode in which only said second data are taken into account, and a third mode in which said first and said second data are both taken into consideration, validation means actuated by said finger for validating said first and second data, wherein said processor uses said first data to pivot said cursor about a center of rotation and said second data to displace the cursor along an axis passing through said center and having a last orientation given to said cursor.

* * * * *